United States Patent [19]

Brown

[11] Patent Number: 4,960,584

[45] Date of Patent: Oct. 2, 1990

[54] ADJUSTABLE EMITTER FOR HEAP LEACH MINING PERCOLATION SYSTEM AND METHOD

[75] Inventor: Sidney L. Brown, Atlanta, Ga.

[73] Assignee: Wade Manufacturing Co., Portland, Oreg.

[21] Appl. No.: 261,919

[22] Filed: Oct. 24, 1988

[51] Int. Cl.$^5$ .......................... C22B 3/02; C22B 3/04
[52] U.S. Cl. .......................... 423/658.5; 75/712;
75/735; 75/737; 239/542; 266/101; 266/168;
423/27; 423/29; 423/41
[58] Field of Search ...................... 75/101 R, 712, 735,
75/737; 266/101, 168; 423/27, 29, 41, 658.5;
239/542

[56] References Cited

U.S. PATENT DOCUMENTS

| 3,420,064 | 1/1969 | Blass et al. | 239/542 |
| 3,604,728 | 9/1971 | Blass et al. | 239/542 |
| 3,792,588 | 2/1974 | Gilaad | 239/542 |
| 4,022,384 | 5/1977 | Hoyle et al. | 239/542 |
| 4,739,973 | 4/1988 | Herndon | 75/101 R |

Primary Examiner—Melvyn J. Andrews
Attorney, Agent, or Firm—Phillips, Moore, Lempio & Finley

[57] ABSTRACT

A system for heap leach mining comprises supply and header pipes for conducting a leaching solution alongside a bed or "heap" of crushed metal-laden ore deposited on an impervious pad. A series of spaced tubes are connected to the supply and header pipes to extend transversely thereof, over the pad, to receive the leaching solution therefrom. A plurality of emitters are connected in spaced relationship along each of the tubes for emitting the leaching solution at a controlled and substantially uniform rate over the pad and into the ore bed. At least some of the emitters are adjustable whereby different sets of flow passages can be utilized. The adjustable emitter comprises a sleeve slip-fit and rotatably mounted in a housing for rotative adjustment between at least two positions to alternately communicate the sets of flow passages with an inlet to the emitter.

30 Claims, 3 Drawing Sheets

ADJUSTABLE EMITTER FOR HEAP LEACH MINING PERCOLATION SYSTEM AND METHOD

TECHNICAL FIELD

This invention relates to hydrometallurgy and more particularly to an adjustable emitter for distributing a leaching solution over a bed of crushed metal-laden ore to separate-out a pregnant solution of metals therefrom.

BACKGROUND OF THE INVENTION

Hydrometallurgy is the art of recovering metals from ores by first effecting solution of the metals in the form of a salt, separating the solution from the impoverished solid, then decomposing the metallic salt in such a way as to cause precipitation of the metal in a state of comparative purity. The leaching solution or lixiviant for reclaiming gold and silver from a bed of low-grade ore generally constitutes aqueous solutions of sodium cyanide mixed with oxygen (air) to convert the noble metal (M) to soluble $NaM(CN)_2$, from which M can be recovered either by precipitation with zinc dust or aluminum powder, carbon absorption, or by electrowinning. Sulfuric acid or sulfuric acid-ferric sulfate is the principle practical copper mineral lixiviant.

U.S. Patent Application Ser. No. 116,465, filed on Nov. 3, 1987 by Richard G. Krauth for "CONTROLLED PERCOLATION SYSTEM AND METHOD FOR HEAP LEACH MINING," discloses a highly efficient system and method for heap leach mining. The system includes a plurality of in-line emitters for distributing the leaching solution over a bed of ore in a closely controlled and uniform manner. When one or more of these emitters becomes clogged, it is necessary to remove and clean each clogged emitter or replace it with the new one. Failure to do so can result in a lowered efficiency in the mining operation.

Further, emitters of this type are each designed for one specific flow rate. Thus, when it is desired to change such flow rate due to a change in environmental conditions, for example, the emitter must be replaced for this purpose. Further, it may be prove desirable to vary the flow rates of the emitters positioned at different locations on a pad due to varying depths of the pad, for example.

SUMMARY OF THE INVENTION

An object of this invention is to provide an improved and adjustable emitter for heap leach mining percolation systems. Although particularly adapted for using in heap leach mining systems, it should be understood that the emitter will find other applications, such as use in drip irrigation systems.

The percolation system comprises supply means for conducting a leaching solution adjacent to an ore bed, a plurality of spaced tubes connected to the supply means and a plurality of in-line emitters connected to the tubes and positioned in spaced relationship therealong for directly emitting the leaching solution into the ore bed at a controlled and substantially uniform rate. At least some of the emitters include at least first and second restricted passages and adjustment means for selectively connecting the inlet to the emitter directly to either the first or second passages.

In the preferred embodiment of this invention, the adjustable emitter comprises a generally cylindrical housing, a generally cylindrical sleeve slip-fit and rotatably mounted in the housing for rotation between first and second positions relative thereto. First and second sets of restrictor flow passages are defined between the housing and sleeve and inlet means, defined between the housing and sleeve, alternately communicates the inlet to the emitter with an upstream end of either one of the first or second sets of restricted flow passages when the sleeve is in its first or second position, respectively. Outlet means communicates downstream ends of each of the first and second sets of flow restrictor passages for emitting liquid exteriorly of the emitter at a controlled and uniform flow rate.

The flow rates through the first and second sets of restrictor flow passages can be the same or different. Further, the passages can be isolated in non-communicating relationship relative to each other or may be formed to communicate with each other to vary the composite restrive flow areas of the passages.

BRIEF DESCRIPTION OF THE DRAWINGS

Other objects and advantages of this invention will become apparent from the following description and accompanying drawings wherein.

DESCRIPTION OF THE PREFERRED EMBODIMENTS

General Description

Figure 1:
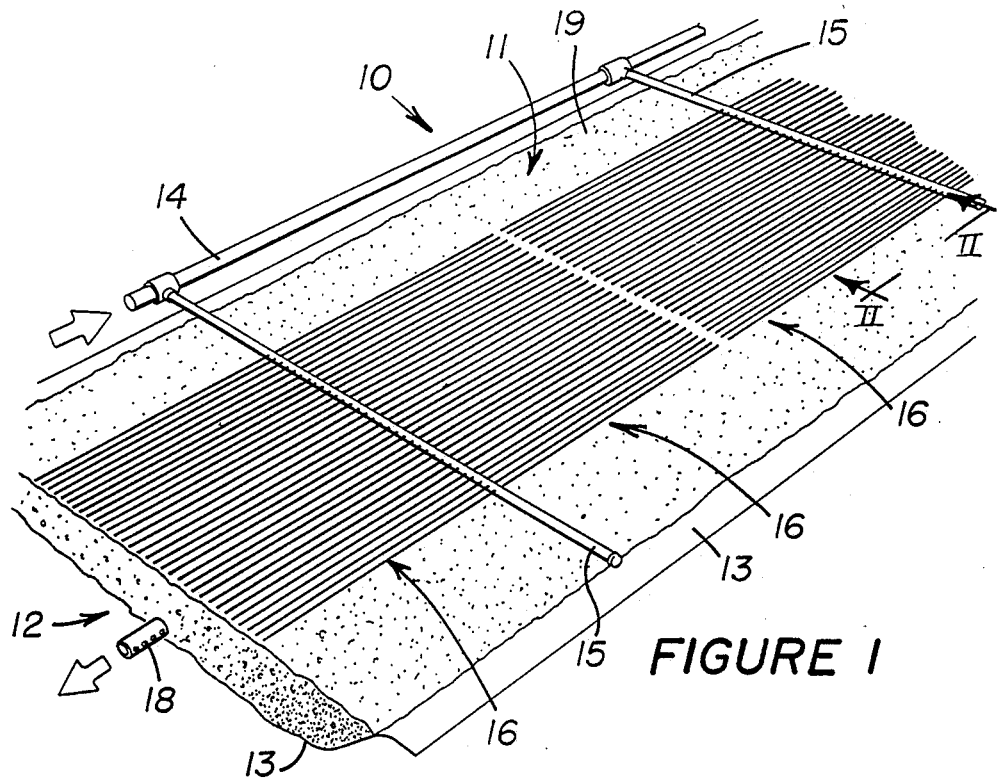
FIG. 1 is a perspective view partially illustrating an ore bed composed of crushed metal-laden ore deposited on an impervious pad and having a controlled percolation system, including adjustable emitters of this invention incorporated therein.

FIG. 1 illustrates a controlled percolation system 10 mounted on the upper surface of an ore bed or "heap" 11 composed of crushed metal-laden ore, such as low-grade gold, silver or copper bearing ores. The ore bed is deposited on a pad 12, shown, for example, in the form of one or more plastic sheets 13 which can be placed over an asphalt or compacted clay base. Heap leach mining is typically employed in conjunction with low grade ore that is normally pre-crushed to suitable size and then treated with a leaching solution (lixiviation), such as an aqueous solution of sodium cyanide, potassium cyanide, acidothiourea, ammoniacal thiosulfate or malononitrile in the case of gold and silver. It should be understood that the system of this invention is equally applicable to the reclamation of other types of metals, such as copper, wherein sulfuric acid or sulfuric acid-ferric sulfate is used as the lixiviant.

Percolation system 10 includes supply means in the form of a mainline pipe 14 and a plurality of header pipes 15 for conducting the liquid leaching solution to separate series of tubes 16, suitably connected to the header pipes. Each tube has a plurality of spaced emitters 17 secured thereon for directly emitting the leaching solution into ore bed 11 at a controlled and substantially uniform rate, in a manner described more fully hereinafter. The pregnant solution is recovered by strategically positioned drain pipes 18 (one shown in FIG. 1) positioned on pad 12. Thereafter, the metals, such as gold, silver or copper, are recovered from the pregnant solution in any well-known conventional manner, such as by precipitation with zinc dust or aluminum powder, carbon absorption or by electrowinning.

DETAILED DESCRIPTION

Mainline pipe 14 is connected to a source of the liquid leaching solution in a conventional manner to receive the solution at a suitable pressure (e.g., 10-100 psi). Emitters 17 function to emit and distribute a substantially uniform and controlled flow rate therefrom, independent of upstream pressure fluctuations. The mainline and header pipes are preferably constructed from a standard plastic material, such as a semi-rigid polyvinylchloride (PVC). A twelve to sixteen inch diameter mainline pipe and six inch diameter header pipes have been found acceptable for this purpose.

Figure 3:
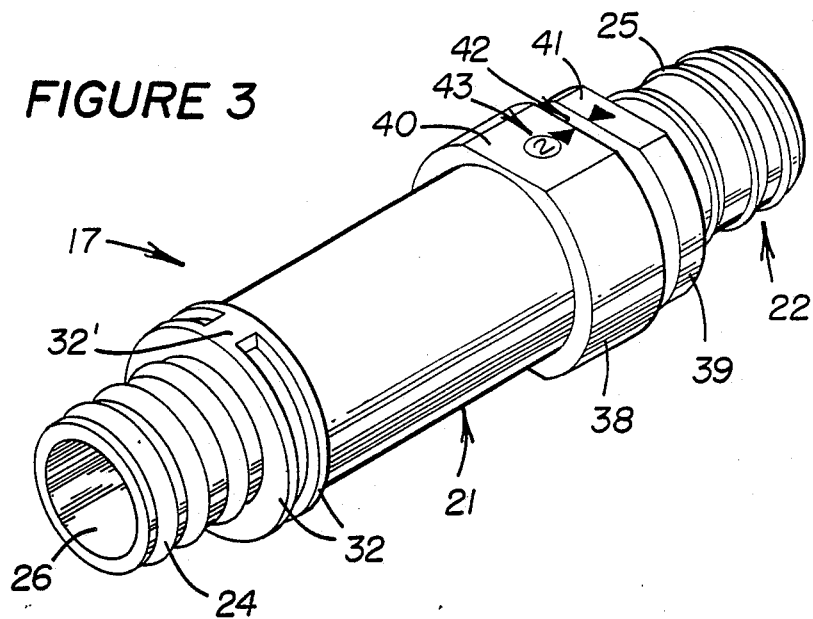
FIG. 3 is an isometric view of an emitter, shown slightly larger than actual scale.

A series of tubes 16 are connected to one or both sides of a header pipe 15 to extend transversely therefrom. In each series, the generally parallel tubes are preferably spaced apart one from another at a distance selected from the approximate range of from 1.0 ft. to 12.0 ft. (FIG. 3). Tubes 16 are preferably composed of a flexible plastic tubing, such as low density polyethylene, that will exhibit sufficient flexibility to at least generally conform to an irregular upper surface 19 of ore bed 11. Although the diameters of the tubes may vary, in one working embodiment of this invention, each tube had a standard outer diameter of 0.620 in. and an inside diameter of 0.520 in. to facilitate assembly of the system from commercially available components.

Figure 2:
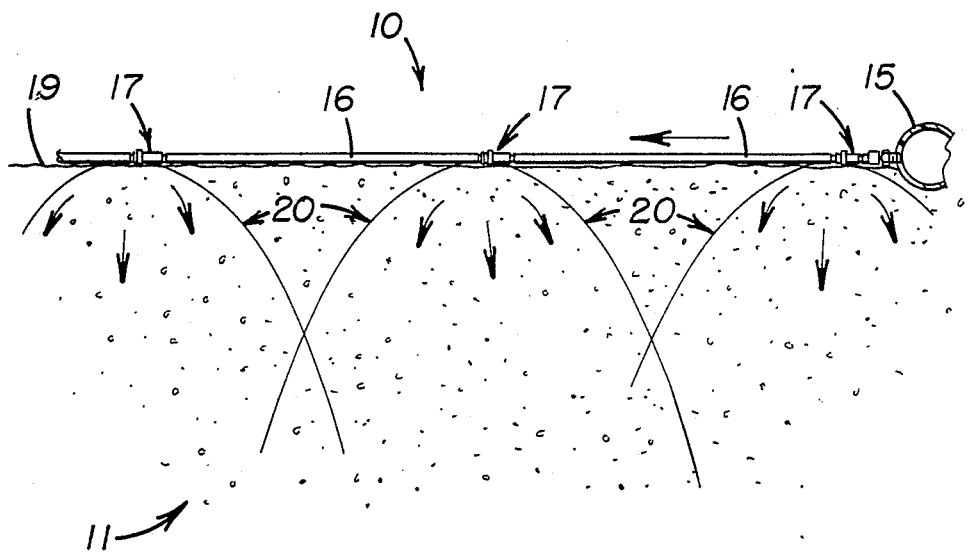
FIG. 2 is an enlarged sectional view in elevation, taken in the direction of arrows II—II in FIG. 1, illustrating a header pipe and one tube having a plurality of the emitters connected therein for directly emitting a leaching solution onto the ore bed.

As shown in FIG. 2, each tube may be positioned on upper surface 19 of ore bed 11 to emit the leaching solution directly into the ore, even though portions of the tubes and emitters 17 may be slightly out of contact with the upper surface of the ore bed due to surface irregularities. The term "emit" (or "emitting") as used herein means a process for dispensing a leaching solution in such a manner that the solution flows or drops down from the dispensing site without being projected horizontally to any substantial extent (e.g., 6.0 in.) above ground level (such as in surface spraying) prior to contact with the bed of crushed ore. The leaching solution will typically be distributed in a generally umbrella-shaped pattern 20, with the adjacent patterns overlapping, as shown. The solution will further penetrate and soak the volume of ore between the patterns under the influence of capillary and related principles influencing fluid flow. Ore bed 11 is normally formed to a depth of from ten to thirty feet.

An inlet means 29, defined between housing 21 and sleeve 22 at a proximal end of the sleeve, alternately communicates inlet 26 with an upstream end of either first or second set of flow restrictor passages 28 or 28' when the sleeve is rotated to its first or second position, respectively. In its first rotative position illustrated in FIGS. 4 and 5, an inlet chamber 30, formed on inner surface of housing 21, communicates inlet 26 with only an inlet passage 31 formed on the outer surface of sleeve 22. The inlet passage is formed at the upstream end of first set of restrictor flow passages 28 to underlie and communicate with inlet chamber 30.

A pair of radial reinforcing flanges 32 are formed on the housing and are interconnected by a web 32', defining inlet chamber 30 therein. The contacting surfaces of the housing and sleeve, disposed circumferentially between the two sets of restrictor flow passages, form a substantial static seal preventing their intercommunication. Labyrinth-type flow passages 28 are formed on the sleeve to provide a zig-zag flow path reversing direction longitudinally through the emitter to communicate a downstream end of the flow passages with a longitudinal passage 33 (FIG. 5).

Figure 4:
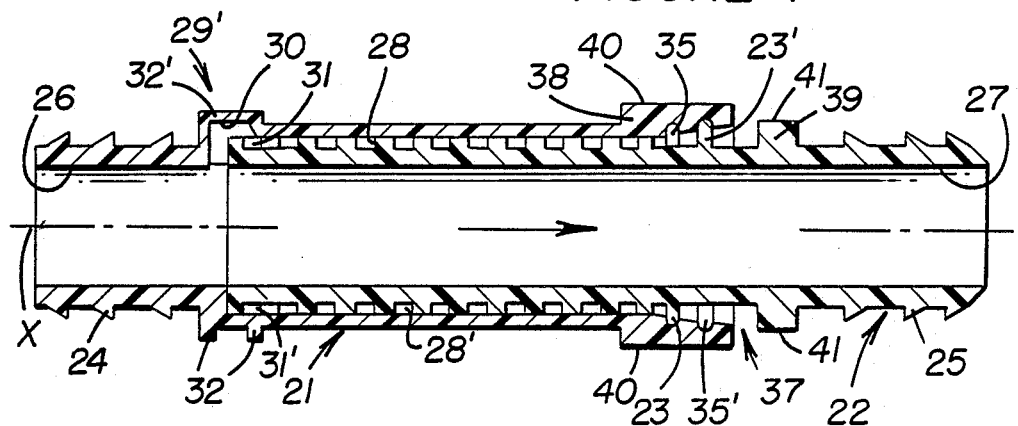
FIG. 4 is a longitudinal cross-sectional view through the emitter.
Figure 5:
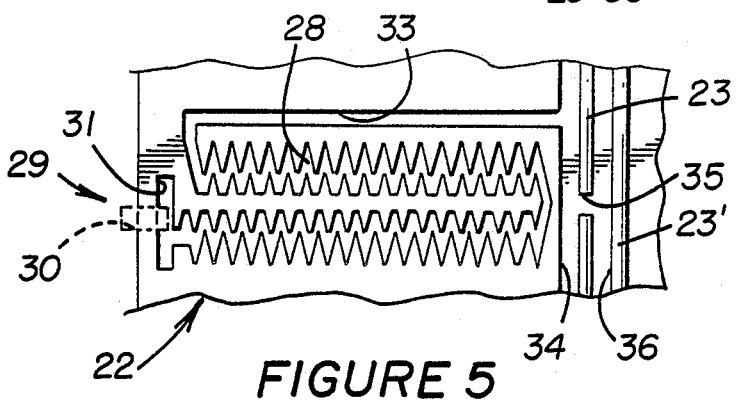
FIG. 5 is a flattened plan view, generally taken in the direction of arrows II—II in FIG. 4, illustrating restrictor flow passages formed in the emitter.

As further shown in FIG. 5, inlet passage 31 extends circumferentially and transversely relative to longitudinal axis X (FIG. 4) of the emitter and has a circumferential length substantially greater than a circumferential width of inlet chamber 30. The downstream end of longitudinal passage 33 communicates with a circumferential passage 34, defined in part by radial flange 23, and with a slot 35 formed through the flange. In turn, slot 35 communicates with a circumferential passage 36, defined between flanges 23 and 23', which further communicates with a similar second slot 35' formed through flange 23' (FIG. 4) on the opposite side of the sleeve.

The liquid solution is then allowed to freely flow out of an outlet 37, defined adjacent to the distal end of housing 21 and between the housing and sleeve 22. The liquid solution is allowed to flow and be distributed in a closely controlled and uniform manner over pad 11 (FIG. 2), preferably at a flow rate selected from the range of from approximately 0.2 gph to 6.0 gph.

Figures 6, 7:
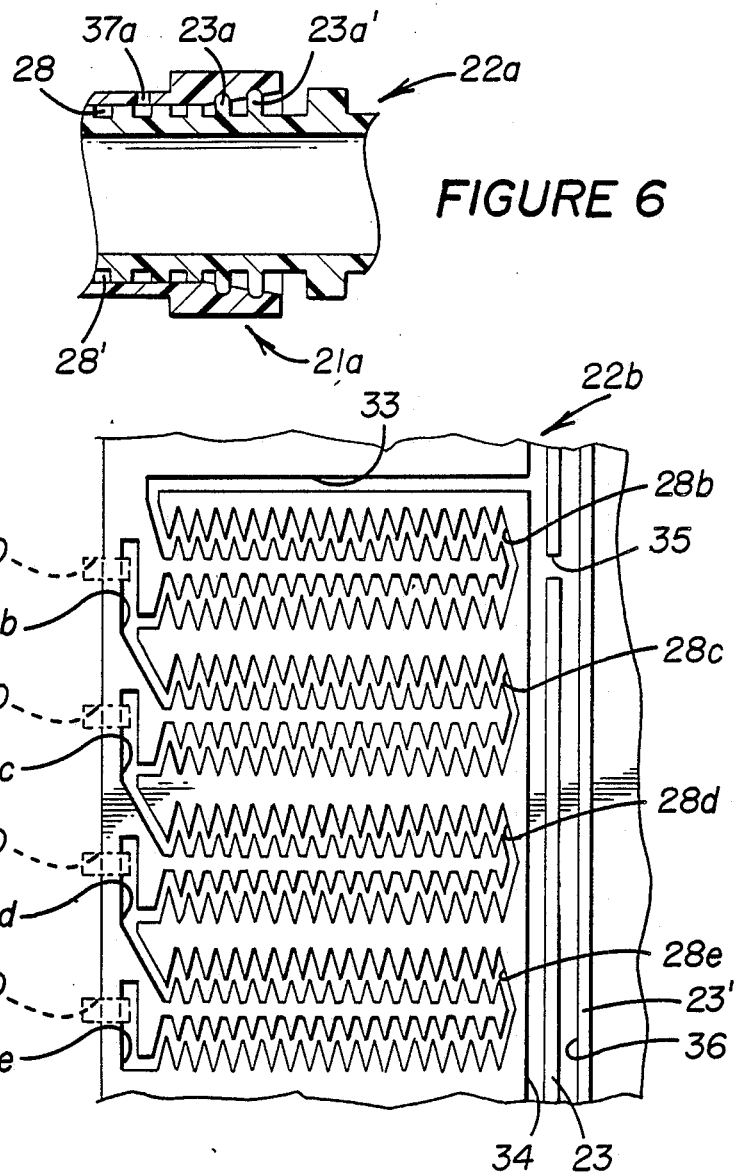
FIG. 6 is a sectional view illustrating a modified outlet from the flow passages.
FIG. 7 is a view similar to FIG. 5, but illustrates a modification of the flow passages.

FIG. 6 illustrates a modified outlet arrangement wherein the outlet comprises at least one radial port 37a formed through the wall of a modified housing 21a. The port is adapted to communicate directly with either flow passage 28 or 28', depending on the rotative position of a modified sleeve 22a relative to the housing. Flanges 23a and 23a' are formed solid (without slots 35 and 35' of FIG. 4) whereby the liquid solution is forced to flow out of port 37a, i.e., flanges 23a and 23a' form static seals at the distal end of housing 21a.

The composite average flow rate from the array of emitters 17 (FIG. 1) is preferably set at a rate selected from the approximately range of from 0.05 to 1.50 gph/ft$^2$ of the surface area of ore bed A more limited preferred range is from 0.06 to 1.20 gph/ft$^2$. As suggested above, each emitter 17 preferably has a flow rate selected from the approximate range of 0.2 gph to 6.0 gph and still more preferably from within the range of from 0.5 to 5.0 gph.

As shown in FIG. 1, each series of tubes 16 and emitters 17 are preferably positioned over (or in some cases within) the ore bed to form at least generally parallel lines separated one from another at a distance selected from the approximate range of from 1.0 ft. to 12.0 ft. The emitters are spaced apart one from another on each of the tubes at a linear distance preferably selected from the approximate range of from 1.0 ft. to 12.0 ft. As shown in FIG. 3, the majority of the emitters in one tube are preferably staggered relative to the emitters in the next adjacent, parallel line of emitters to further aid in the substantially uniform saturation of ore bed 11 with the solution.

The rate at which the leaching solution is distributed over a unit area of the pad will depend on a number of predetermined design and related factors, such as the viscosity of the leaching solution, the size of the restrictor passages of each of the emitters and the spacing of the emitters relative to each other. The required time of contact of the leaching solution with the ore bed will be largely determined by the degree of pulverization of the ore, the strength of the leaching solution, the degree of solubility of the mineral or the form in which it occurs, and the effectiveness of the contact. Such contact time may be from four hours to sixty days with many of the applications requiring from seven to forty-five days. In many instances the process can be accelerated by heating the leaching solution and/or by aeration wherein air is injected and mixed with the solution prior to or during its distribution over the pad.

The means for selectively rotating sleeve 22 180°, relative to housing 21 (or visa versa) is shown in FIGS. 3 and 4 a comprising collars 38 and 39 formed externally on the housing and sleeve, respectively. Collar 38 is formed with a pair of diametrically opposed flats 40 adapted for engagement with a standard open-end or spanner wrench whereas collar 3 is formed with similar flats 41. The collars are preferably formed at the distal ends of the housing and sleeve and are positioned longitudinally closely adjacent to each other whereby a workman is enabled to hold one wrench and rotate the other wrench to block flow passages 28 and align inlet chamber 30 with inlet passage 31' of flow passages 28' (FIG. 4).

When sleeve 22 is rotated 180° relative to housing 21 (or visa versa) flow through passages 28 will be blocked and flow of the leaching solution will sequentially flow from inlet 26 and through inlet chamber 30, inlet passage 31', flow passages 28', slots 35 and 35' and into the ore bed via outlet 37. Flow passages 28 and 28' can be suitably constructed and sized to provide substantially the same flow rates or they can be constructed and sized to provide different flow rates. Although the substantial circumferential length of inlet passage 31 (FIG. 5) will provide a substantial tolerance in respect to communication of inlet chamber 30 with a respective one of the flow passages 28 and 28' alignment indicia 42 (FIG. 3) can be formed on flats 40 and 41 (or elsewhere) to visually indicate correct circumferential alignment of the sleeve and housing. Numerical indicia 43 can also be formed on the housing or sleeve to visually indicate the flow rate of the emitter at this setting, e.g., 2.0 gph.

FIG. 7 illustrates a modification of flow passages 28 wherein a plurality of sets of flow passages 28$b$, 28$c$, 28$d$ and 28$e$ communicate with each other in series. As schematically illustrated, when the housing and sleeve are in a first rotative position relative to each other, inlet chamber 30 will communicate with an inlet passage 31$b$ to further communicate the liquid solution through first set of restrictor flow passages 28$b$ and thence to longitudinal passage 33. The liquid leaching solution will then flow through passage 34, port 35, passage 36 and port 35' (FIG. 4) for egress through outlet 37 of the emitter in the manner described above.

When the housing and sleeve are rotated (e.g., 30°) relative to each other to communicate inlet chamber 30 with a second inlet passage 31$c$, flow will occur through both sets of flow passages 28$c$ and 28$b$ whereby a higher resistance to fluid flow will occur, thus reducing the outflow (gph) from the emitter. Further restriction to flow can be achieved by rotating and adjusting the emitter to communicate inlet chamber 30 with either inlet passage 31$d$ or 31$e$, communicating with the upstream ends of restrictor flow passages 28$d$ and 28$e$, respectively. Similar sets of multiple flow passages of the type shown in FIG. 7, can be formed diametrically opposite on the sleeve, if so desired.

The size, length and other design parameters used for constructing an emitter will depend upon the particular application under consideration. Each set of flow passages can be uniform or can be shaped differently to vary the flow restriction therethrough. In leaching solution applications herein under consideration, wherein clogging may become a problem, the cross-sectional areas throughout each set of passages should be sufficiently large to deter such clogging.

I claim:

1. A controlled percolation system for heap leach mining over an ore bed composed of crushed metal laden ore deposited on an impervious pad comprising supply means for conducting a leaching solution adjacent to said ore bed, a plurality of spaced tube means connected to said supply means for receiving said leaching solution therefrom; and a plurality of in-line emitter means each having an inlet and an outlet connected to said tube means and positioned in spaced relationship along each of said tube means for directly emitting said leaching solution into said ore bed at a controlled and substantially uniform rate, at least some of said emitter means including at least first and second restricted passage means and adjustment means for selectively connecting said inlet directly to either said first or said second restricted passage means whereby said leaching solution will either flow from said inlet through said first restricted passage means and of out said outlet, or from said inlet, through said second restricted passage means and out of said outlet.

2. The system of claim 1 wherein said plurality of emitter means emit said leaching solution at a rate selected from the approximate range of from 0.05 to 1.50 gph/ft$^2$ of the surface area of said ore bed for a particular leaching solution having a constant viscosity.

3. The system of claim 2 wherein each of said emitter means has a flow rate selected from the approximate range of from 0.2 gph. to 6.0 gph.

4. The system of claim 1 wherein the flow rates through said first and second restricted passage means are substantially the same for a particular leaching solution having a constant viscosity.

5. The system of claim 1 wherein the flow rate through said first restricted passage means is substantially different than the flow rate through said second restricted passage means for a particular leaching solution have a constant viscosity.

6. The system of claim 1 wherein said first and second restricted passage means are isolated in noncommunicating relationship relative to each other.

7. The system of claim 1 wherein said first and second restricted passage means communicate with each other.

8. An adjustable in-line emitter disposed on a longitudinal axis thereof and adapted for closely controlling distribution of a liquid leaching solution from a percolation system used for heap leach mining comprising a tubular housing having an inlet defined at a proximal end thereof for receiving said leaching solution thereat, a tubular sleeve, slip-fit and rotatably mounted in said housing for rotation between first and second positions relative to said housing, having an outlet defined at a distal end thereof to communicate unrestricted flow of said leaching solution from said inlet to said outlet, first passage means defined between said housing and said sleeve for communicating restricted flow of said leaching solution from said inlet and a proximal end of said sleeve to a distal end of said housing and for emitting said leaching solution from said emitter at a first flow rate selected from the approximate range of from 0.2 gph to 6.0 gph when said sleeve is in its first position, and second passage means defined between said housing and said sleeve for communicating restricted flow of said leaching solution from said inlet and the proximal end of said sleeve to the distal end of said housing and for emitting said leaching solution from said emitter at a second flow rate selected from the approximate range of from 0.2 gph to 6.0 gph when said sleeve is in its second position.

9. The emitter of claim 8 further comprising first and second collar means, formed exteriorly on said housing and said sleeve, respectively, for each receiving a spanner wrench thereon to rotate said sleeve relative to said housing, between its first and second positions.

10. The emitter of claim 8 wherein each of said first and second passage means comprises at least two parallel and connected labyrinth-type flow passages formed in circumferentially spaced relationship on an outer surface of said sleeve to extend in the direction of said axis and a longitudinal passage formed on the outer surface of said sleeve to connect a labyrinth-type flow passage of each of said first and second passage means with said outlet means.

11. The emitter of claim 8 further comprising an inlet chamber formed on the inner surface of said housing and communicating with said inlet and an inlet passage formed on the outer surface of said sleeve at an upstream end of each of said first and second passage means to underlie and communicate with said inlet chamber when said sleeve is in a respective one of its first and second positions.

12. The emitter of claim 11 wherein s id inlet passage extends transversely relative to said axis and has a circumferential length substantially greater than a circumferential width of said inlet chamber.

13. The emitter of claim 8 further comprising at least one radial flange formed on said sleeve and at least one slot formed through said flange to communicate with the downstream ends of each of said first and second passage means and exteriorly of said emitter.

14. An adjustable in-line emitter disposed on a longitudinal axis thereof for emitting liquid at a controlled and uniform rate comprising a generally cylindrical housing having an inlet defined at a proximal end thereof, a generally cylindrical sleeve, slip-fit and rotatably mounted in said housing for rotation between first and second positions relative to said housing, having an outlet defined at a distal end thereof continuously communicating with said inlet, a first set of restrictor flow passages defined between said housing and said sleeve, a second set of restrictor flow passages defined between said housing and said sleeve and spaced circumferentially from said first set of restrictor flow passages, inlet means, defined between said housing and said sleeve at a proximal end of said sleeve for alternately communicating said inlet with an upstream end of either said first or second set of flow restrictor passages when said sleeve is in its first or second position, respectively, and outlet means communicating with downstream ends of each of said first and second sets of flow restrictor passages for emitting liquid exteriorly of said emitter at a controlled and uniform flow rate.

15. The emitter of claim 14 wherein the proximal end of said housing and the distal end of said sleeve each have means for attaching said emitter in-line between a pair of tubes.

16. The emitter of claim 14 further comprising first and second collar means, formed exteriorly on said housing and said sleeve, respectively, for each receiving a spanner wrench thereon to rotate said sleeve relative to said housing, between its first and second positions.

17. The emitter of claim 14 wherein said first and second collar means are formed at the distal ends of said housing and said sleeve, respectively, and adjacent to each other.

18. The emitter of claim 14 wherein each of said first and second sets of restrictor flow passages comprises at least two parallel and connected labyrinth-type flow passages formed on an outer surface of said sleeve to extend in the direction of said axis.

19. The emitter of claim 14 wherein each of said first and second sets of restrictor flow passages further comprises a longitudinal passage formed on the outer surface of said sleeve to connect each of said labyrinth-type flow passages with said outlet means.

20. The emitter of claim 14 wherein said inlet means comprises an inlet chamber formed on the inner surface of said housing and communicating with said inlet and an inlet passage formed on the outer surface of said sleeve at the upstream end of each of said first and second sets of restrictor flow passages to underlie and communicate with said inlet chamber when said sleeve is in a respective one of its first and second positions.

21. The emitter of claim 20 wherein said inlet passage extends transversely relative to said axis and has a circumferential length substantially greater than a circumferential width of said inlet chamber.

22. The emitter of claim 14 further comprising at least one radial flange formed on said sleeve and wherein said outlet means comprises at least one slot formed through said flange to communicate with the downstream ends of each of said first and second sets of restrictor flow passages.

23. The emitter of claim 14 wherein the flow rate through said first set of restrictor flow passages is substantially different than the flow rate through said second set of restrictor flow passages.

24. The emitter of claim 14 wherein said first and second sets of restrictor flow passages are isolated in non-communicating relationship relative to each other.

25. The emitter of claim 14 wherein said first and second sets of restrictor flow passages communicate with each other.

26. A method for percolating a leaching solution through an ore bed composed of granular metal-laden ore deposited on an impervious pad comprising the steps of supplying and conducting a leaching solution to said ore bed, emitting said leaching solution directly into said ore bed from a first set of restrictive passages defined in an emitter, and adjusting said emitter to emit said leaching solution into said ore bed from a second set of restrictive passages defined in said emitter.

27. The method of claim 26 wherein said leaching solution is emitted from each of said first and second restrictive passages at a rate selected from the approximate range of from 0.05 to 1.50 gph/ft$^2$ of surface area of said ore bed for a particular leaching solution having a constant viscosity.

28. The method of claim 27 wherein said leaching solution is emitted from a substantial number of emitters positioned at spaced locations relative to each other.

29. The method of claim 27 wherein said leaching solution is emitted from each of said emitters at a flow rate selected from the approximate range of from 0.2 gph to 6.0 gph.

30. The method of claim 26 wherein said emitter comprises a tubular housing having a tubular sleeve rotatably mounted therein and said adjusting step comprises rotating said housing and sleeve relative to each other.

* * * * *

UNITED STATES PATENT AND TRADEMARK OFFICE
CERTIFICATE OF CORRECTION

PATENT NO. : 4,960,584
DATED : October 2, 1990
INVENTOR(S) : Sidney L. Brown

It is certified that error appears in the above-identified patent and that said Letters Patent is hereby corrected as shown below:

Column 4, line 46 after "bed" insert -- 11. --

Column 5, line 16, after "4" delete "a" insert -- as --, line 20, after "collar" delete "3" insert -- 39 -- and line 40, after "28'" insert -- , --.

Claim 12, column 7, line 41, after "wherein" delete "s id" insert -- said --.

Signed and Sealed this

Seventeenth Day of March, 1992

Attest:

HARRY F. MANBECK, JR.

*Attesting Officer*     *Commissioner of Patents and Trademarks*